US005215814A

United States Patent [19]

Gager et al.

[11] Patent Number: 5,215,814

[45] Date of Patent: Jun. 1, 1993

[54] PRINTING FILM

[75] Inventors: Morgan E. Gager, Warwick; David Atherton, North Kingstown, both of R.I.; Surendra K. Gododia, East Brunswick, N.J.

[73] Assignee: Arkwright Incorporated, Inc., Fiskeville, R.I.

[21] Appl. No.: 680,200

[22] Filed: Apr. 5, 1991

[51] Int. Cl.[5] .......... B32B 9/00

[52] U.S. Cl. .......... 428/246; 428/331; 428/340; 428/480; 428/497; 428/514; 428/688; 427/209

[58] Field of Search .......... 428/215, 483, 327, 195, 428/454, 207, 285, 331, 340, 480, 497, 514, 688; 427/209

[56] References Cited

U.S. PATENT DOCUMENTS 5,047,286 9/1991 Kaburaki et al. .......... 428/285

*Primary Examiner*—Patrick J. Ryan

*Assistant Examiner*—W. Krynski

*Attorney, Agent, or Firm*—Birch, Stewart, Kolasch & Birch

[57] ABSTRACT

A fast drying printing film composite for use in offset lithography and similar printing applications comprising a transparent, translucent or opaque film substrate having an ink receptive essentially transparent polymeric layer on at least one side of the substrate, said ink receptive layer containing one or more polymers or copolymers, at least one of said polymers or copolymers being soluble or swellable in an aliphatic hydrocarbon solvent, said ink receptive layer having a solvent absorptivity of Isopar G of from 14% to 45% by weight with respect to the weight of the ink receptive layer, a Sheffield surface roughness value of less than 140 cc of air/minute and an offset dry time of less than about two hours.

48 Claims, 1 Drawing Sheet

PRINTING FILM

The present invention relates to a multilayer coated film or film composite for use in offset lithography and similar printing applications. Offset lithography printing is an important and widely used printing process which has many advantages. Offset plates are easily made from metals or photopolymers in the smallest printing shop. The process involves few mechanical operations and is more economical for short runs; half tones are produced in high fidelity. The range of application includes single or multicolor printing of books, periodicals, newspapers, and commercial and packaging materials.

At present, plastic film is not frequently used in offset printing applications, because of the following drawbacks: (1) Conventional solvent based inks most commonly used for offset printing take up to 24 hours to dry to a non-offsetting state which is unacceptably long. and (2) Plastic films generally do not possess the antistatic properties required to dissipate static charges. This latter deficiency causes frequent jams through the printing equipment.

Some attempts have been made to circumvent these problems, the most notable of which has been described in European Patent Application No. 262228. This reference teaches the use of an ink receptive layer of rubbery polymers, namely copolymers of butadiene, and of styrene resins, namely styrene copolymers. Although the technology described there represents a modest advancement, it falls short of the drying requirement need of the offset printing industry.

In order to greatly expand the use of plastic films for general offset printing, these films would require a special coating that accepts conventional offset printing inks, dries substantially faster than currently available materials and feeds reliably. Plastic films offer opportunities for use in many applications because they are dimensionally stable, weather resistant, oil and water resistant, and highly durable. Some of the applications for such films include graphic art displays, overlays, book covers, packaging, labels and products which require long life and are in frequent use.

This invention represents a major advance in plastic composite films by providing the qualities necessary to achieve acceptance for offset printing. In particular, the ink receptive layers disclosed in this invention accept most conventional printing inks and shorten the holding period before further handling usually to within thirty minutes or less of ink application without the need for any special drying equipment. The best currently commercially available material requires from 4 to 10 times longer to dry to the same condition than the product of this invention, the variation depending on the type and amount of ink. The film composite of the invention also has an antistatic property which prevents the jamming of the printing press at high printing speeds.

The objective of the present invention is to provide a film which overcomes the deterrents to the use of plastic films for offset printing. This is attained by a multilayer film composite and more particularly by a three layer film composite comprising an ink receptive layer, a support layer, and an antistatic layer.

BRIEF DESCRIPTION OF THE DRAWINGS

There are three main configurations for the film composite of the invention, as shown in FIGS. 1-3 in the accompanying drawing. For purposes of the present description, the first configuration in FIG. 1 will be discussed herein, but the same principles would hold true for the other configurations as shown in FIGS. 2 and 3. For the further purpose of this invention, the ink receptive layer is an essentially transparent film while the substrate may be transparent, translucent or opaque.

More specifically, the product design objectives of the film of the present invention are summarized as follows:

Figure 1:
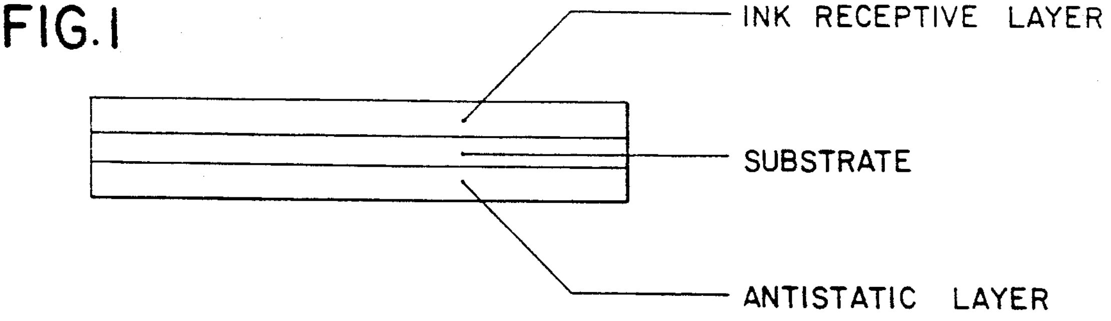

1) The ink receptive layer must have affinity for the solvent used in the ink and at the same time maintain its integrity throughout all phases of printing. In the present invention at least one of the polymers utilized must be soluble or swellable in an aliphatic hydrocarbon solvent such as mineral spirits, VM & P Naphtha, Magie Sol, or Isopar. The polymeric composition of the ink receptive layer matrix is selected to have an Isopar G solvent absorptivity of from 14 to 45% of the weight of the ink receptive layer and a fast dry time. In certain embodiments the ink receptive layer also contains particulates which serve as spacers to reduce contact with the overlying sheet and to facilitate feeding.

2) The support or substrate layer is a polymeric material, the properties of which are based on the intended application. These properties include dimensional stability, transparency, translucency, opacity, tensile strength, adhesion characteristics, thermal stability and hardness. A number of base film supports are available that serve this purpose, the most common of which is polyester film such as polyethylene terephthalate.

3) The antistatic layer on the back side of the film comprises polymeric binders, organic or inorganic conductive agents and spacer particulates. This layer provides suitable surface resistivity and roughness to ensure that the film composite feeds reliably and dissipates any static charge generated.

In a preferred embodiment of the invention, the film composite is comprised of an ink receptive layer containing silica particulates dispersed in a copolymer of n-butyl methacrylate and isobutyl methacrylate, a supporting layer of polyethylene terephthalate and an antistatic layer opposite to the ink receptive layer side, said antistatic layer comprised of silica particulates dispersed in a binder of melamine-formaldehyde, partially hydrolyzed polyvinyl acetate, and a quaternary salt of an acrylamide copolymer.

The solvent based inks that are applicable to the invention are normally comprised of three major material components:

1) Colorants: These include pigments, toners, and dyes, and provide the color contrast with the substrate.
2) Vehicle: This is defined as the liquid portion of the ink in which the colorants are dispersed. It is composed of binder and solvent, and acts as a carrier for the colorants during the printing operation. Upon drying, the binder portion of the vehicle adheres the colorants to the substrate. The vehicle used in the ink helps determine the drying or setting characteristics of the ink.
3) Additives: These influence the printability, film characteristics, drying speed, and end-use properties.

The most common type of ink used in offset lithography is formulated to dry by oxidation of components of the binder and contains a substantial portion of unsaturated vegetable oils and oil modified alkyd resins for this purpose. Inks which dry by polymerization or by a combination of oxidation and polymerization may also be used. The conventional ink which is used for printing paper usually contains around 30% of aliphatic solvent. The most commonly used solvents are Magie Sol and Isopar. Where oxidation type inks are employed, typical oils used in the ink are linseed, chinawood, and the like. Various resinous materials such as alkyds, rosin and phenolics may also be used in the ink. The oils and resinous materials are used to bind the colorants and provide a coherent film which adheres to the substrate upon drying. The colorants are pigments and/or dyes which are known in the art. Driers, in the form of soaps of cobalt, manganese and lead formed with organic acids such as linolenic, naphthenic and octanoic acids, catalyze oxidation of the drying oils and are used in inks that dry by oxidation to accelerate drying.

Conventional offset inks when printed on untreated plastic substrates normally take well over 12 hours to become dry to the touch. This fact particularly precludes the use of plastic film in high speed printing, because ink drying time is an important factor in the economics of printing. As an alternative, a special type of ink (quick setting) may be used for plastic substrates. Such inks generally contain very little solvent (0–5%) to circumvent the problem of non-absorption and the consequent slow drying time. However, these inks may require drying processes such as infrared or ultraviolet curing which limit their use to special applications.

To reach the broad printing market, it would be advantageous if the plastic substrate could be printed using conventional inks and equipment.

The film composite of the present invention comprises an essentially clear ink receptive layer, a support layer and an antistatic layer. This multilayer configuration of the film composite ensures good image qualities, fast drying of ink, and good transport properties through the offset printing machine.

Typical solvent based inks employed in the printing process contain around 30 percent of high boiling aliphatic solvents such as Magie Sol 52. The balance of the composition comprises binders, pigments and additives. The drying mechanism of conventional ink on paper is by solvent absorption, evaporation, oxidation and/or polymerization. Conventional films that are insoluble or non-swellable in the ink vehicles are unable to absorb the solvents, which substantially delays the drying process. It is therefore believed therefore necessary to have an ink receptive layer in the film composite which has a strong affinity for aliphatic solvents to remove them from the surface of the film wherein the ink setting process takes place.

The ink receptive layer of certain embodiments of the present invention comprises a polymer or blend of polymers and particulates. The matrix provides both the desired vehicle adsorptive qualities and the surface qualities that accelerate the rate of ink drying and minimize ink offset. The ink receptive layer is generally characterized by its coating weight, solvent adsorption, integrity, surface roughness, toughness and light transmission or haze.

The ink receptive layers which were discovered to provide the advantages afforded by this invention have a strong affinity for the solvent. In the drying of the ink, the binder portion of the vehicle oxidizes and/or polymerizes to form a coherent and tough image which basically completes the drying process. Thus, the drying mechanism enabled by the present invention produces results similar to that of a paper substrate. This eliminates the need for special inks and any special drying equipment.

The key to successful absorption of the vehicle solvents is the affinity of the solvent to the polymer or polymer mixture in the ink receptive layer. The following test has been devised to identify potential polymers for use in the film matrix.

The ink receptive coating is applied over a polyester substrate with a dry coat weight of around 4 grams per square meter. The procedure for coating is described in the Examples below.

Absorptivity is determined by the following method.

Two 2 inch by 4 inch test specimens of the ink receptive film are first conditioned under TAPPI conditions. These specimens have an X cut on one end so that they can be hung in a glass jar. The specimens after conditioning are weighed on an analytical balance to an accuracy of 0.1 milligram in a conventional glass weighing bottle ($W_1$). The preweighed conditioned specimens are then suspended in a 0.5 gallon glass jar above the liquid. The glass jar is 4.5 inches in diameter and 8 inches in height and contains about 530 grams of Isopar G solvent (Exxon CAS registry No. 647432-48-9; vapor pressure at 38° C.=14 mm of Hg). The specimens are suspended back to back by a single hook so that the ink receptive layers do not touch each other, and they are hung from the coated cardboard seal of the cap of the jar. The cap is tightly sealed onto the jar.

The specimens are exposed to the Isopar G vapor in the jar for 4 hours under standard TAPPI conditions. The specimens are then removed from the glass jar, placed in the weighing bottle and weighed ($W_2$). The difference in the weight of the specimen before and after solvent exposure gives the amount of solvent absorbed. The ink receptive layer on each specimen is then removed by an active solvent such as methyl ethyl ketone. The specimens, after the ink receptive coatings have been removed, are then reconditioned at TAPPI conditions and reweighed in the weighing bottle ($W_3$).

$W_1$=Weight of test specimen before solvent exposure $W_2$=Weight of test specimen after solvent exposure $W_3$=Weight of test specimen after removing the ink receptive layer.

$$\% \text{ Absorbency} = \frac{W_2 - W_1}{W_1 - W_3} \times 100$$

The solvent absorptivity value is recorded as an average of six test results. The higher the % Absorbency for a given solvent, the faster the drying rate of the ink, all other factors being equal. However, if the coating absorbs too much solvent, the coating can lose its integrity or become tacky upon application of the ink. The range for solvent absorption (% Absorbency) in the ink receptive layer is preferably from 14% to 45% and more preferably from 18% to 32% by weight of the ink receptive layer when tested as specified above.

A screening test was employed to identify promising polymer candidates for the binder of the ink receptive layer, wherein the polymer candidates can be used singly or in combination to provide the required solvent absorption. It is possible to select a combination of polymers with solvent absorptions above and below the acceptable range which, when used together in the ink receptive matrix, fall within the acceptable solvent absorbency range. Table I lists the polymers and their % Absorbency determined in a screening test.

TABLE I

| Isopar G Absorbency of Resins (% by Weight) | |
|---|---|
| Polymer | % Asorbency |
| Rohm & Haas Acryloid DM54 Acrylic copolymer | 0.0 |
| Mitsubishi Rayon BR100 Methyl methacrylate | 0.0 |
| Goodyear Vitel PE200 saturated polyester | 0.7 |
| Air Products Vinac B-15 Vinyl acetate | 1.4 |
| Cargill 16-1079 Methyl methacrylate copolymer | 1.5 |
| Goodyear Pliotone Type CPR 6935 Amino function acrylate | 1.6 |
| Lawter Krumbhaar 1717 HMP Ketone resin | 3.1 |
| Interpolymer Syntran Ex 20-19 Butyl acrylate - butyl methacrylate | 14.4 |
| Hercules Ester Gum 8L Rosin ester | 15.3 |
| DuPont Elvacite 2044 n-butyl methacrylate | 20.0 |
| Mitsubishi Rayon BR 102 Methacrylate copolymer | 23.1 |
| Mitsubishi Rayon BR 118 n-butyl/isobutyl methacrylate copolymer | 23.1 |
| DuPont Elvacite 2046 50:50 copolymer of n-butyl and isobutyl methacrylate | 23.5 |
| Hercules Staybelite Ester 10 hydrogenated rosin ester | 25.8 |
| DuPont Elvacite 2045 Isobutyl methacrylate | 26.2 |
| Hercules Pentrex G Dibasic acid modified rosin ester | 28.4 |
| Hercules Pentalyn C Polymerized rosin ester | 38.6 |
| Hercules Picco 7140 Aromatic petroleum resin | 39.5 |
| Hercules Inkovar 1150 Modified hydrocarbon resin | 58.0 |
| Hercules Pentalyn A Pentaerythritol ester of wood rosin | 58.3 |

The chemical compositions noted above were obtained from the manufacturer's trade literature.

Once the absorbency values are determined, the polymers are evaluated singly and in combination to determine which fall within the acceptable absorbency range of 14%-45%. Copolymers consisting of moieties of higher and lower absorptivities may also be used and have been found to perform similar to or even better than homopolymer blends. In making a suitable selection of polymers for the ink receptive layer, its integrity must be taken into account. A solvent absorbency that is too high or an inappropriate choice of polymers will often be at the expense of film integrity. This will cause the matrix to become tacky or lose its cohesiveness or its adhesiveness to the base support, particularly during the ink drying period. The appropriate homopolymer, copolymer or polymeric combination for use in the ink receptive layer is determined by its conformance to the requirements of ink receptivity, dry time, integrity and print feed characteristics.

It is desirable to have particulates present in the image receptive layer and/or the antistatic (antistat) layer. The particulates function as spacers which prevent intimate contact between the consecutively printed sheets during sheet fed offset printing. This helps prevent wet ink transfer from the printed side to the unprinted side of the next sheet. The surface characteristic of the image receptive layer required to achieve suitable performance may be characterized by its Sheffield roughness value. Advantageously, this roughness parameter is below 140 cc of air/minute and preferably below 90 cc of air/minute as measured on a Sheffield smoothness tester. Excessive roughness of the ink receptive layer causes a deterioration of the image quality, adversely affecting, for example, image resolution.

The surface characteristics depend on the type and size of particulates employed and their concentration in the polymer binders. Examples of inorganic, organic or polymeric particulates suitable for the image receptive layer include amorphous silica, crystalline silica, aluminum trihydrate, calcium carbonate, clays, aluminum silicates, polyolefin particulates, organic pigments and mixtures thereof.

The surface roughness of the coating is measured on a Bendix Precisionaire Sheffield smoothness instrument. To obtain consistent values it is necessary to lower the testing head in a gentle and uniform manner with no discernible impact due to downward motion of the head. The Sheffield value is expressed as cc of air/minute. The higher the value, the rougher the surface. The Sheffield smoothness value reported represents an average of five tests for each specimen.

Because of the need for clear film in many important applications, it is sometimes necessary to keep a minimum haze, preferably in the range of 0 to 30 percent, as measured on Gardner Pacific's Haze Guard XL211.

The measurement of the haze value of the ink receptive layer is obtained by applying the coating from which the layer is made to the surface of a very clear film substrate such as ICI Melinex 505 (polyethylene terephthalate). The haze level of the ink receptive layer is the difference between the values obtained on the coated film and the uncoated film.

The drying property of the ink is found to be also dependent on the coating weight of the ink receptive layer. If the coating weight is too low, the ink does not dry fast enough, whereas if the coating weight is too high, the film medium tends to curl on drying. The coating weight of the ink receptive layer typically ranges from 1 gram per square meter to 12 grams per square meter and more preferably from 3 to 7 grams per square meter.

A fast ink drying rate is important to the acceptance of plastic films in commercial printing operations. In order to study the drying characteristics of the ink receptive layer of printing films, the following laboratory "dry-to-touch" or dry time test was developed: A test specimen of ink receptive layer is prepared by the application of the coating solution on an 8½ inch×11 inch sheet of polyethylene terephthalate film using the Meyer rod technique and air dried in an oven as detailed in the Examples. The conventional offset ink used for this test is Offset Cyan T-11 obtained from National Printing Ink Company in Marietta, Ga., USA. The ink is applied on the ink receptive layer using the "Quick Peek" Colorproofing Kit and procedure obtained from Thwing-Albert Instrument Company.

While the foregoing laboratory test is useful for screening purposes, a more precise method is required to provide a reasonably accurate dry time. This is accomplished on a small sheet-fed offset press utilizing an offset test plate having one inch by seven inch bars and unmodified Superior Offset premium black #A 7224, a conventional offset ink. The image density was controlled to a density of about 1.65, as measured on a Macbeth TD904 densitometer using the Yellow Filter.

In each instance, 50 sheets of paper preceded the printing of the first film sheet, and offset dry time was determined on the first film sheet printed. This offset printing procedure was devised to ensure reliable ink dry time, or otherwise the results will vary with the type and amount of ink applied. The dry time of the ink is evaluated every 15 minutes by placing a 1 inch×3 inch strip of Xerox 4024 DP Xerographic paper on the printed bars and applying firm finger pressure with a dual rubbing motion to the strip. The amount of ink transferred from the test specimen to the paper strip is used to judge the drying time of the ink. When there is essentially no visible ink transfer, a dry-to-touch stage is deemed to be achieved and the time required to reach this stage is designated as the Offset Dry Time. This result means that the sheet can be handled without ink smearing or offsetting.

The Offset Dry Time and % Absorbency of the various ink receptive surfaces studied are listed in Table II.

TABLE II

| | Offset Dry Time Minutes | Absorbency % |
|---|---|---|
| ICI Melinex 505* | >720 | 0 |
| DuPont Elvacite 2046 | 30-60 | 23.5 |
| DuPont Elvacite 2044/2045 (1:1) | 45 | 28.4 |
| Hercules Pentrex G | 30 | 28.4 |
| Mitsubishi Rayon BR 118 | 60 | 23.1 |
| Dynic Alinda OFT | 360 | 8.9 |

*Polyester film

The dry time in the offset printing test was devised to be longer than that obtained in commercial printing so that differences in dry time of test materials could be readily distinguished. This longer drying time was achieved by deleting the drier in the ink and utilizing a printing density of about 1.65. The ink receptive layer of the preferred embodiment was also evaluated under an actual industrial printing application. Printing film (sheet size 17"×22") as described in Example I below was tested on a Four Color Heidelberg sheet fed offset press with a speed of 8000 impressions per hour. The ink used for this test was conventional offset ink obtained from Toyo Ink Company. The Offset Dry Time obtained was just 15 minutes. This confirms the superior drying characteristics of the printing film of the present invention. The printing film of this invention retained its integrity on printing and had the requisite surface properties required of printing films.

It is believed that the faster drying of the printing film of the invention is due to the fact that the ink receptive layer functions by absorbing the aliphatic solvents contained in the conventional offset ink. Typically, the binder of offset ink comprises linseed oil and alkyd resin which crosslinks by air oxidation. It is believed that the absorption of the aliphatic solvent by the ink receptive layer accelerates the air oxidation of the ink binder which quickly yields a tough crosslinked dried ink layer. This was confirmed by conducting a solvent rub test. The solvent used for the rub test on the printed image was Magie Sol 52 (Technical grade white oil, CAS #64742-46-7; Vapor Pressure @ 70° F.=0.04 mm of Hg) obtained from Magie Brothers. The procedure for applying the ink on the ink receptive layer is described earlier herein. A piece of cotton was soaked with the solvent and hand rubbed against the ink layer at 30 minute intervals. After 8 hours of testing it was found that around 150 rubs of solvent were required to dissolve the ink layer in the Arkwright PC-405 printing film (made according to Example I herein), whereas only 15 rubs were required to remove the ink layer from the commercially available "Alinda" film (obtained from Dynic Corporation). This confirms that the ink receptive layer of the present invention aids the setting, via perhaps oxidation and crosslinking, of offset ink and hence has superior drying characteristics as compared to other commercially available printing films.

The binder polymers for the ink receptive layer must have affinity for aliphatic solvents and at the same time maintain their integrity during the ink drying process. Polymers and copolymers of acrylic or alkyl acrylic acids and their alkyl esters, i.e., acrylate and methacrylate polymers, either singly or in combination, typically may be used in the ink receptive layer to produce the required solvent absorptivity and film integrity. More generally, rosin derivatives, modified phenolics, vinyl ether resins, alkyds, and the like may be employed. Polymers appropriate for the ink receptive layer are those which impart fast drying for conventional offset printing inks printed onto the film. Films with such polymers in the ink receptive layer have absorbency and dry-to-touch characteristics as described in the present specification. The integrity of the ink receptive layer can be determined while conducting the dry-to-touch test. If, in addition to the ink, the ink receptive layer also transfers to the paper in the dry-to-touch test, then the ink receptive layer is taken to have lost its integrity.

In the present invention, it has been found that a superior balance of properties of the ink receptive layer is obtained through the use of polymers derived from alkyl esters of acrylic acid and alkyl acrylic acids and their copolymers, said polymers having monomeric units with the general structure A or B where, $$A = (CH_2{-}CH{-}COOR)$$

$$B = (CH_2{-}\overset{\overset{\displaystyle CH_3}{|}}{C}{-}COOR)$$

and R is an aliphatic group preferably having a chain length of 1 to 6 carbon atoms, and said copolymers are comprised of one or more of both A and B units or two or more A type units or two or more B type units, where the A and B type units differ in their respective aliphatic groups.

Polymers suitably selected from this class for the ink receptive layer provide the requisite properties for printing film applications. These properties include clarity, solvent absorptivity, fast drying, integrity, toughness and light stability. The polymeric composition employed in the ink receptive layer of this invention has a solvent absorptivity of from 14 to 45% and an offset dry time of less than about two hours, preferably less than 75 minutes, maintains its integrity during printing and is essentially free of tack after drying.

It was specifically found that ink printed on the layer comprising a copolymer of isobutyl methacrylate and n-butyl methacrylate dried rapidly and well and that the film coating maintained its integrity. It is also possible to use blends of poly (n-butyl methacrylate) and poly(isobutyl methacrylate). Poly(n-butyl methacrylate) and poly(isobutyl methacrylate), when used individually in the ink receptive layer, do not dry the ink as well as a blend of both polymers. A higher plasticizer effect of the ink vehicle upon poly (n-butyl methacrylate) may give a more tacky surface on printing, whereas poly (isobutyl methacrylate) is not plasticized to the same extent. Thus, the plasticizer effect of the ink vehicle must be taken into consideration in selecting the polymer blend.

Generally, a suitable selection of a blend of the individual polymer components is preferred in order to obtain optimal ink drying and freedom from tack. Alternatively, a copolymer may be used to achieve similar or superior results either alone or in combination with a homopolymer. The polymer components in the polymer blend or the moieties in the copolymer may be selected through the use of the solvent absorptivity test. The composition of lower and higher aliphatic solvent-absorbing polymers or copolymer moieties in the ink receptive matrix preferably should be in the ratio from 1:9 to 9:1 and more preferably in the ratio of 3:7 to 7:3 of the higher and lower aliphatic solvent absorptive polymers or copolymer moieties. The term solvent-absorptive copolymer moieties as used herein refers to the absorptivity of the homopolymers from which the copolymers are derived.

The addition of one or more driers to the ink receptive layer further may help catalyze the oxidation of the drying oils in the printing ink. Driers are metallic soaps containing alkaline earth or heavy metals combined with monobasic carboxylic acids of 7 to 22 carbon atoms. Examples are soaps of bismuth, calcium, lithium, cobalt, iron, lead, manganese, zinc and zirconium formed with organic acids such as linolenic, naphthenic and octanoic acids.

The supporting layer or substrate of the present invention is a polymeric material which has suitable dimensional stability, transparency, translucency or opacity, tensile strength, adhesion characteristics, thermal stability and hardness. Suitable polymeric materials for use as a supporting layer are thermoplastic polymers, including polyesters, polysulfones, polycarbonates, polyvinyl chloride, polystyrene, polyimides, polyolefins, polymethyl methacrylate, cellulose esters such as cellulose acetate and others known in the art. A polyethylene terephthalate polyester film is particularly preferred. A pretreatment of the substrate as practiced in the trade may be required to achieve good adhesion to the ink receptive layer and/or the antistatic back coat layer. The thickness of the supporting layer is not particularly restricted, and is typically in the range of about 2 to 10 mils, and preferably in the range of 3.0 to about 5.0 mils.

It is known in the art that antistat properties are advantageous to ensure reliable feeding of the film through the printing machine. Said antistat properties may reside on either or both sides of the film. In a preferred embodiment, an antistatic layer is employed on the side opposite to the ink receptive layer of the print film. It comprises polymeric binders, inorganic or polymeric particulates, and conductive agents or materials. This layer may have a clear or matte finish. For clear coatings the weight ratio of polymer binder to particulates preferably should be about 100:1 to about 166:1, but a coating with a lower ratio can be used with a loss of transparency. For a matte coating, the weight ratio of polymeric binder to particulates preferably should be lower than 1:1. The matte surface provides good drafting properties along with erasability characteristics for pencil and pen. The presence of particulates in the antistatic layer or back coat of the film also prevents intimate contact with the ink receptive layer, thereby helping to avoid transfer of the ink to the sheet which it contacts. It is possible to have a back coat on the film with no antistatic agent or to have no back coat at all, provided that the ink receptive layer contains an antistatic agent.

Figure 2:
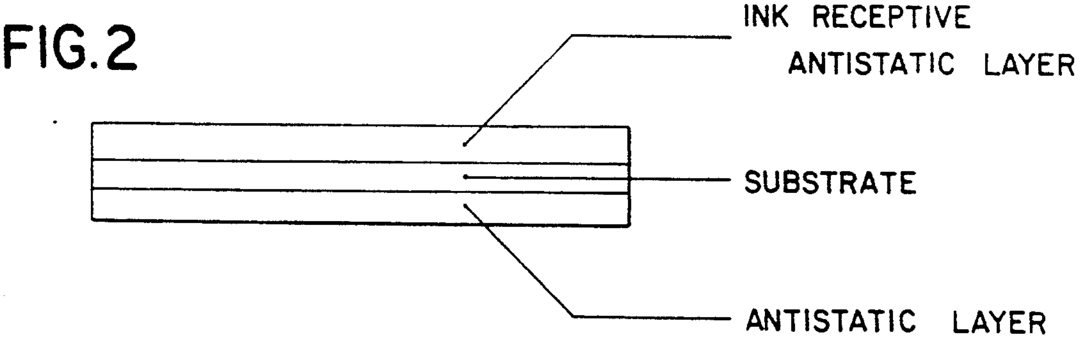
Figure 3:
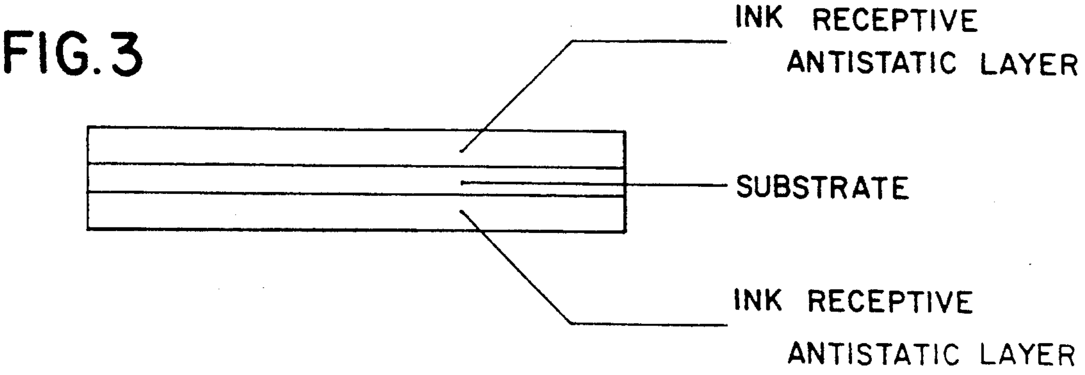

The polymers used as binders in the antistatic or back coat layer include acrylic resins, vinyl acetate resins, hydrolyzed polyvinyl acetate, vinyl chloride resins, cellulose acetate butyrate resins, cellulose acetate propionate resins, carbonate resins, polyester resins, urethane resins, epoxy resins, melamine-formaldehyde resins and styrene resins. Preferred polymer binders useful in the composition of the coating are melamine-formaldehyde resins and 15-75% hydrolyzed polyvinyl acetate. Polymeric binders can be crosslinked using acid catalysts such as benzoic acid, p-toluene sulfonic acid, n-butyl phosphoric acid, amine salts of carboxylic acids and alkyl sulfonic acids. Particulates that can be used in the antistatic layer include amorphous silica, crystalline silica, calcium carbonate and polyolefins either singularly or in combination. It is also possible to include antistatic agents in the ink receptive layer as shown in FIGS. 2 and 3 in the drawing.

The conductive property of the antistatic agent in the back coat layer is introduced by either organic conductive agents or inorganic conductive pigments. Preferred examples of organic conductive agents used in the invention include sulfonated polystyrene, quaternized silicones, quaternized cellulosic ethers, quaternized acrylics, and the like. Inorganic conductive pigments suitable for the back coat layer include tin oxides doped with indium or antimony. A preferred antistatic layer has a surface resistivity of about $1\times10^{6}$ to $1\times10^{13}$ ohms/square at 25° C. and 50% relative humidity (RH). It is also possible to incorporate antistatic materials in the ink receptive layer. This may be achieved by the appropriate use of organic conductive agents such as those listed above which are compatible with the ink receptive layer. In this type of composite the ink receptive antistatic coating may be applied to both sides of the polyester film which provides a printable surface on both sides of the film.

In the preferred embodiment, the supporting layer is first coated with the ink receptive layer using the Meyer rod technique and dried in an air dried oven at a temperature range of 100° to 150° C. for about two to four minutes. The antistatic layer may then be placed on the opposite or back side of the supporting layer using the Meyer rod technique and dried at a temperature range of 120° to 150° C. for two to four minutes.

Any of a number of methods may be employed in the production coating of the individual layers in the film composite, such as roller coating, rod coating, slide coating, curtain coating, doctor coating, flexographic coating or gravure coating. Such techniques are well known in the art.

The multilayer film composite of the present invention has unique properties which enables it to dry conventional inks much faster than other plastic films and also ensures reliable feeding in the printing equipment.

It is an advantage of the present invention that while it was developed for offset printing employing organic solvent based inks, it may be used for other printing methods such as gravure, letterpress and screen printing and also with non-solvent based inks such as ultraviolet-cured inks.

The following examples further illustrate the present invention but by no means limit the scope of said invention. Unless otherwise noted, the percentages therein and throughout the application are by weight.

EXAMPLE I

An ink receptive layer of the following composition was prepared:

| | |
|---|---|
| Copolymer of n-butyl methacrylate and isobutyl methacrylate (Ratio 50:50) | 19.97 parts |
| Amorphous silica (average particle size 8.4 microns) | 0.17 part |
| Methyl ethyl ketone | 39.93 parts |
| Toluene | 39.93 parts |

Methyl ethyl ketone was mixed with toluene for five minutes. The copolymer of n-butyl methacrylate and isobutyl methacrylate was then added and mixed for thirty minutes or until the copolymer was completely dissolved. Amorphous silica was added and dispersed using high speed dispersing equipment. The mixture was then coated on a four mil thick transparent polyethylene terephthalate by means of a Pilot Coater at 50 feet per minute at a drying temperature of 130° C. This gave a film product with a transparent coating. The film product had a haze of 2.0 percent, surface smoothness of 33 cc of air/minute, solvent absorptivity of 22.5% by weight of coat weight, and coat weight of 5.7 grams per square meter.

An antistatic layer of the following composition was then coated on the side opposite to the ink receptive layer of polyethylene terephthalate film from the following mixture:

| | |
|---|---|
| Methyl Cellosolve | 36.29 parts |
| Methanol | 38.89 parts |
| Quaternary salt of diacetone acrylamide copolymer (Calgon Corporation) | 3.53 parts |
| 35% hydrolyzed polyvinyl acetate (35% vinyl alcohol and 65% vinyl acetate) | 11.92 parts |
| Melamine-formaldehyde (Reichhold Chemicals, Inc.) | 6.59 parts |
| Amorphous silica (av. particle size 8.4 microns) | 0.06 part |
| Acid catalyst | 2.10 parts |

The antistatic layer was prepared by mixing Methyl Cellosolve, methanol and diacetone acrylamide copolymer for five minutes. To the solution, 35% hydrolyzed polyvinyl acetate, melamine-formaldehyde and amorphous silica were added and mixed for another twenty minutes. The catalyst was then added and the liquid was mixed for two minutes. The mixture was coated using a No. 8 Meyer rod onto the side opposite to the ink receptive layer by means of a Pilot Coater at 50 feet per minute at a drying temperature of 150° C.

The haze, Sheffield roughness and surface resistivity of the antistatic coated film were found to be 2%, 14 cc of air/minute and $7.1\times10^9$ ohm/square, respectively and the Offset Dry Time was found to be about 30 minutes.

EXAMPLE II

Another printing film of the following composition was prepared in a similar manner as in Example I using coating liquids of the following composition:

| | |
|---|---|
| The Ink Receptive Layer | |
| Copolymer of n-butyl methacrylate and isobutyl methacrylate (50:50) | 18.58 parts |
| Amorphous silica (Av. particle size 8.4 microns) | 0.17 part |
| Methyl ethyl ketone | 37.15 parts |
| Toluene | 37.15 parts |
| Dow Corning X1-6136 (Obtained from Dow Corning Corp.) | 6.81 parts |
| The Supporting Layer: | |
| White opaque polyethylene terephthalate | |
| The Antistatic Layer: | |
| Copolymer of n-butyl methacrylate and isobutyl methacrylate (50:50) | 18.58 parts |
| Amorphous silica (Av. particle size 8.4 micron) | 0.17 part |
| Methyl ethyl ketone | 37.15 parts |
| Toluene | 37.15 parts |
| Dow Corning X1-6136 | 6.81 parts |

The resulting opaque printing film has ink receptive and antistatic properties on both sides and is printable on either or both sides. For the one-side coated product, the surface resistivity and Sheffield roughness were $7.1\times10^{10}$ ohms/square and 39 cc of air/minute, respectively. The absorbency of the ink receptive coating was 20%. This printing film had an Offset Dry Time of 60 minutes, and the integrity and surface properties required for good offset printing film.

EXAMPLE III

Another printing film was prepared in the laboratory by applying the ink receptive layer mixture on 4 mil thick transparent polyester film using a No. 20 Meyer rod and dried at 130° C. for two minutes. The composition of the coatings was as follows:

| The Ink Receptive Layer: | |
|---|---|
| Methyl ethyl ketone | 39.94 parts |
| Toluene | 39.93 parts |
| Poly n-butyl methacrylate | 9.98 parts |
| Poly isobutyl methacrylate | 9.98 parts |
| Amorphous silica (Av. particle size 8.4 micron) | 0.17 part |

The haze and Sheffield values of the coating were 6.1 percent and 70 cc of air/minute, respectively. The solvent absorptivity of the ink receptive coating was 28.4 percent of the coat weight by weight.

| | |
|---|---|
| The Supporting Layer: | |
| Transparent polyethylene terephthalate film. | |
| The Antistatic Layer: | |
| Methyl Cellosolve | 36.92 parts |
| Methanol | 38.89 parts |
| Quaternary salt of diacetone acrylamide copolymer (Calgon Corporation) | 3.53 parts |
| 35% hydrolyzed polyvinyl acetate (35% vinyl alcohol and 65% vinyl acetate). | 11.92 parts |
| Melamine-formaldehyde (Reichhold Chemicals, Inc.) | 6.59 parts |
| Amorphous silica (Av. particle size 8.4 micron) | 0.06 part |

-continued

| | |
|---|---|
| Acid catalyst | 2.10 parts |

The antistatic mix was applied with a No. 8 Meyer rod on the side opposite to the ink receptive layer and dried at 130° C. for 2 minutes.

The haze, surface resistivity and Sheffield roughness of the antistatic layer were 2%, $6.3\times10^9$ ohms/square and 12 cc of air/minute, respectively. This printing film had an Offset Dry Time of 45 minutes, and the integrity and surface properties required for good offset printing film.

EXAMPLE IV

Another printing film was prepared in the same manner as in Example III using the following composition:

| The Ink Receptive Layer: | |
|---|---|
| Methyl ethyl ketone | 39.94 parts |
| Toluene | 39.93 parts |
| Hercules Pentrex G | 19.96 parts |
| Amorphous silica (Av. particle size 8.4 micron) | 0.17 part |

The haze and Sheffield values of the coating were 10.5 percent and 135 cc of air/minute, respectively. The solvent absorptivity of the ink receptive coating was 28.4% of the coat weight by weight and the Offset Dry Time was 30 minutes.

| | |
|---|---|
| The Supporting Layer: | |
| Transparent polyethylene terephthalate film. | |
| The Antistatic Layer: | |
| Methyl Cellosolve | 36.92 parts |
| Methanol | 38.89 parts |
| Quaternary salt of diacetone acrylamide copolymer (Calgon Corporation) | 3.53 parts |
| 35% hydrolyzed polyvinyl acetate (35% vinyl alcohol and 65% vinyl acetate) | 11.92 parts |
| Melamine-formaldehyde (Reichhold Chemicals, Inc.) | 6.59 parts |
| Amorphous silica (Av. particle size 8.4 micron) | 0.06 part |
| Acid catalyst | 2.10 parts |

The haze, surface resistivity and Sheffield roughness of the antistatic layer were 2%, $6.3\times10^9$ ohms/square and 12 cc of air/minute, respectively.

The printing results of all of the foregoing Examples showed very good quality, no loss of integrity and freedom from tack.

The invention being thus described, it will be obvious that the same may be varied in many ways. Such modifications are not to be considered as a variation from the spirit and scope of the invention, and all such modifications as would be obvious to one skilled in the art are intended to be included within the scope of the following claims.

We claim:

1. A fast drying printing film composite comprising a transparent, translucent or opaque film substrate having an ink receptive essentially transparent polymeric layer on at least one side of said substrate, said ink receptive layer containing one or more polymers or copolymers with the exception of butadiene and styrene resins, at least one of said polymers or copolymers being soluble or swellable in an aliphatic hydrocarbon solvent, said ink receptive layer having a solvent absorptivity of Isopar G of from 14% to 45% by weight with respect to the weight of the ink receptive layer, a Sheffield surface roughness value of less than 140 cc of air/minute and an offset dry time of less than about two hours.

2. A printing film according to claim 1, wherein said ink receptive layer has an offset dry time of less than 75 minutes at room temperature.

3. A printing film according to claim 1, wherein said ink receptive layer has a haze level no greater than about 30.

4. A printing film according to claim 1, which further includes one or more driers in said ink receptive layer.

5. A printing film according to claim 1, wherein the solvent absorptivity of Isopar G is from 18% to 32% by weight of the ink receptive layer.

6. A printing film according to claim 1, wherein the substrate is a polyester, polyolefin, cellulose ester, polycarbonate, polystyrene or polyvinyl chloride.

7. A printing film according to claim 6, wherein the substrate is polyethylene terephthalate film.

8. A printing film according to claim 1, wherein the ink receptive layer contains inorganic or organic particulates.

9. A printing film according to claim 8, wherein the particulates are amorphous or crystalline silica, calcium carbonate or polyolefin particulates or mixtures thereof.

10. A printing film according to claim 1, wherein the ink receptive layer contains silica particulates.

11. A printing film according to claim 1, wherein the Sheffield surface roughness of the ink receptive layer is less than 90 cc of air/minute.

12. A printing film according to claim 1, wherein the coating weight of the ink receptive layer is from 1 to 12 grams per square meter.

13. A printing film according to claim 1, wherein the coating weight of the ink receptive layer is from 3 to 7 grams per square meter.

14. A printing film according to claim 1, wherein the ink receptive layer contains polymers or copolymers selected from the group consisting of rosins modified phenolics, vinyl ether resins, alkyds, polyacrylates and polymethacrylates.

15. A printing film according to claim 1, wherein the ink receptive layer contains a copolymer of isobutyl methacrylate and n-butyl methacrylate or a blend of poly (n-butyl methacrylate) and poly(isobutyl methacrylate).

16. A printing film according to claim 4, wherein the drier in the ink receptive layer is a metallic soap containing alkaline earth or heavy metals combined with monobasic carboxylic acids having from 7 to 22 carbon atoms.

17. A printing film according to claim 16, wherein the drier is one or more soaps of bismuth, calcium, lithium, cobalt, iron, lead, manganese, zinc or zirconium with an organic acid.

18. A printing film according to claim 17, wherein the organic acid is linolenic, naphthenic or octanoic acid.

19. A printing film according to claim 1, wherein an antistatic layer is present on the back side of the film and/or an antistatic agent is included in the ink receptive layer on one or both sides of the film.

20. A printing film according to claim 19, wherein an ink receptive layer is present on one side of the film and an antistatic layer is present on the back side of the film.

21. A printing film according to claim 19, wherein an ink receptive antistatic layer is present on one side of the film and an antistatic layer is present on the back side of the film.

22. A printing film according to claim 19, wherein an ink receptive antistatic layer is present on both sides of the film.

23. A printing film according to claim 19, wherein the ink receptive layer includes an organic conductive agent.

24. A printing film according to claim 19, wherein the antistatic layer on the back side of the film includes an organic or inorganic conductive agent.

25. A printing film according to claim 19, wherein the ink receptive layer and/or the antistatic layer contains inorganic or organic particulates.

26. A printing film according to claim 19, wherein the surface resistivity of the antistatic layer or ink receptive antistatic layer is about $1\times10^6$ to $1\times10^{13}$ ohms/square at 25° C. and 50% relative humidity.

27. A printing film according to claim 1, wherein an ink receptive antistatic layer is present on one side of the film and a non-antistatic back coat or no back coat is present on the back side of the film.

28. A fast drying printing film composite comprising a transparent, translucent or opaque substrate having an ink receptive essentially transparent layer with a haze value of 0 to about 30 on at least one side of said substrate, said ink receptive layer containing particulates dispersed in an acrylate or methacrylate polymer coating, said ink receptive layer having a solvent absorptivity of Isopar G of from 14% to 45% by weight with respect to the weight of the ink receptive layer, a Sheffield surface roughness value of less than 140 cc of air/minute and an offset dry time of less than about two hours.

29. A printing film according to claim 28, wherein a layer containing an antistatic agent is present on the back side of the film.

30. A printing film according to claim 28, wherein an antistatic agent is included in the ink receptive layer on one or both sides of the film.

31. A printing film according to claim 28, wherein the solvent absorptivity of Isopar G is from 18% to 32% by weight of the ink receptive layer.

32. A printing film according to claim 28, wherein the substrate is polyethylene terephthalate film.

33. A printing film according to claim 28, wherein the ink receptive layer contains silica particulates.

34. A printing film according to claim 29, wherein the ink receptive layer and/or the antistatic layer contains inorganic or organic particulates.

35. A printing film according to claim 30, wherein the ink receptive layer and/or the antistatic layer contains inorganic or organic particulates.

36. A fast drying printing film composite comprising a transparent, translucent or opaque substrate having an ink receptive essentially transparent layer with a haze value of 0 to about 30 on at least one side of said substrate, said ink receptive layer containing silica particulates dispersed in a copolymer of n-butylmethacrylate and isobutyl methacrylate or a blend of poly(n-butyl methacrylate) and poly(isobutyl methacrylate) in a weight ratio of 1:9 to 9:1, said ink receptive layer having a solvent absorptivity of Isopar G of from 14% to 45% by weight with respect to the weight of the ink receptive layer, a Sheffield surface roughness value of less than 140 cc of air/minute and an offset dry time of less than about two hours and a layer containing an antistatic agent on the back side coating of the film.

37. A printing film according to claim 36, wherein an antistatic agent is included in the ink receptive layer on one or both sides of the film.

38. A printing film according to claim 36, wherein the weight ratio of poly(n-butyl methacrylate) to poly(isobutyl methacrylate) in the polymer blend is from 3:7 to 7:3.

39. A printing film according to claim 37, wherein the weight ratio of poly(n-butyl methacrylate) to poly(isobutyl methacrylate) in the polymer blend is from 3:7 to 7:3.

40. A printing film according to claim 36, wherein the substrate is polyethylene terephthalate.

41. A printing film according to claim 37, wherein the substrate is polyethylene terephthalate.

42. A printing film according to claim 36, wherein the antistatic layer on the non-printing or back side of the film comprises silica particulates dispersed in a binder of melamine-formaldehyde, partially hydrolyzed polyvinyl acetate and a quaternary salt of an acrylamide polymer.

43. A printing film according to claim 37, wherein the antistatic layer on the back side of the film comprises silica particulates dispersed in a binder of melamine-formaldehyde, partially hydrolyzed polyvinyl acetate and a quaternary salt of an acrylamide polymer.

44. In a method for offset printing, the improvement which comprises using as the printing medium a fast drying printing film composite comprising a transparent, translucent or opaque film substrate having an ink receptive essentially transparent polymeric layer on at least one side of said substrate, said ink receptive layer containing one or more polymers or copolymers with the exception of butadiene and styrene resins, at least one of said polymers or copolymers being soluble or swellable in an aliphatic hydrocarbon solvent, said ink receptive layer having a solvent absorptivity of Isopar G of from 14% to 45% by weight with respect to the weight of the ink receptive layer, a Sheffield surface roughness value of less than 140 cc of air/minute and an offset dry time of less than about two hours.

45. The method according to claim 44, wherein said ink receptive layer has a haze level no greater than about 30.

46. The method according to claim 45, wherein the substrate is polyethylene terephthalate film.

47. The method according to claim 45, wherein the ink receptive layer contains inorganic or organic particulates.

48. The method according to claim 45, wherein an antistatic layer is present on the back side of the film or wherein an antistatic agent is included in the ink receptive layer on one or both sides of the film.

* * * * *